Patented Apr. 1, 1930

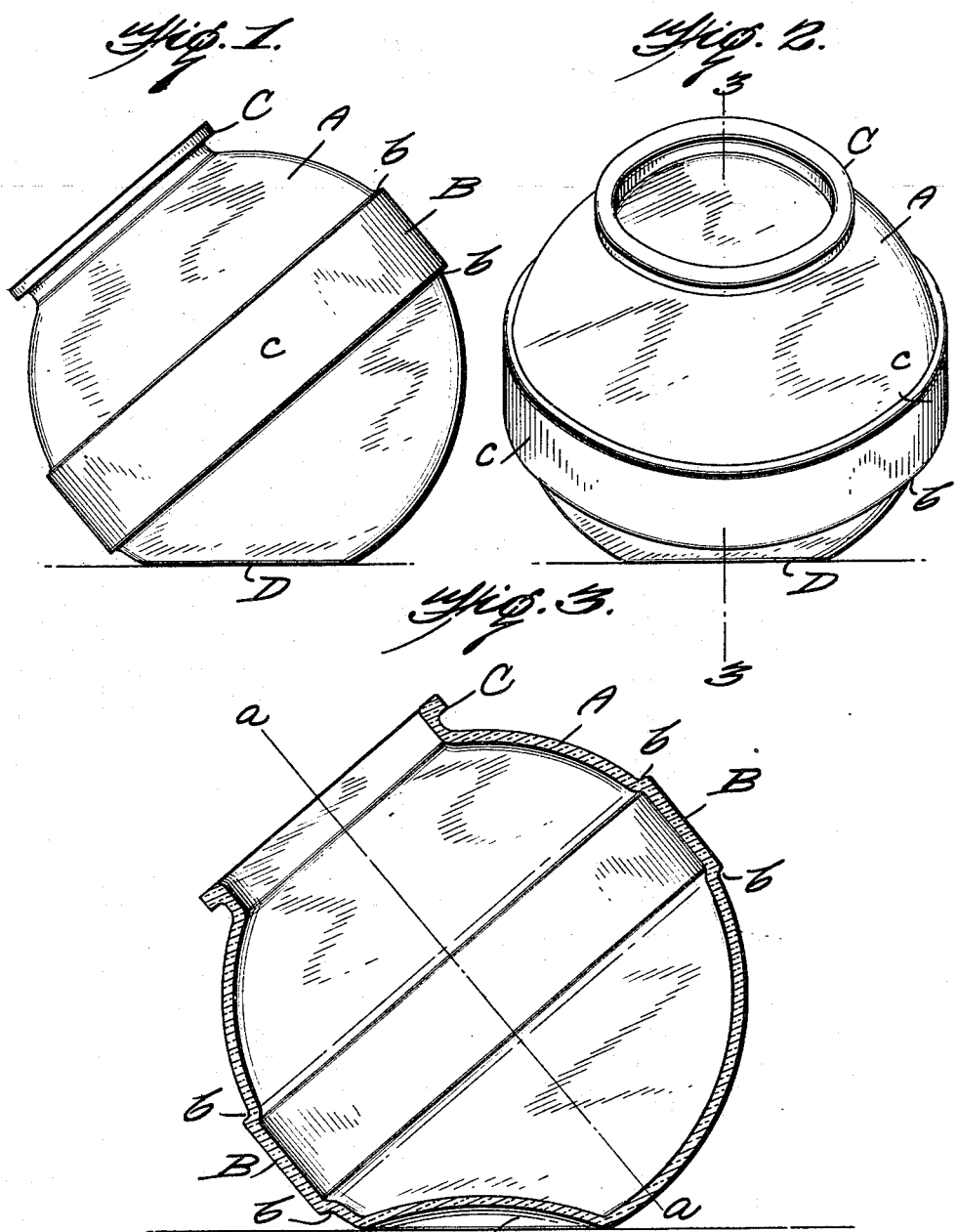

1,752,291

UNITED STATES PATENT OFFICE

FERDINAND S. BARBIERS, OF LANCASTER, OHIO, ASSIGNOR TO THE HOCKING GLASS COMPANY, OF LANCASTER, OHIO, A CORPORATION OF OHIO

GLASS DISPENSING VESSEL

Application filed April 11, 1927. Serial No. 182,977.

This invention relates to a glass dispensing vessel and has for its object to provide a construction therein which, for a given weight of glass will afford maximum capacity and strength, with a maximum degree of accessibility and of compactness in display, and which will at the same time show to advantage its contents and be easily fabricated and cleaned. With these objects in view my invention consists in the construction and arrangement of the vessel as will be hereinafter more fully described and as shown in the accompanying drawing in which corresponding parts are designated by similar marks of reference.

Figures 1 and 2 are vertical elevations respectively taken at right angles to each other of a vessel embodying my invention.

Figure 3 is a vertical section on lines 3—3 of Figure 2.

The vessel forming the subject matter of this invention consists generally speaking of a spherical body A surrounded by an equatorial cylindrical zone B, whose diameter is at least equal to that of the sphere. Hence annular shoulders $b$ are formed on each end of the zone, uniting the same with the spherical portion. The spherical body of the equatorial zone of the axis $a$—$a$ of the spherical zone, and adjacent to the other end of the axis is flattened in a plane inclined to the axis, forming a flat bottom D, extending, on the one side, from the intersection of the axis with the surface and on the other side to a point adjacent to the equatorial zone.

By this construction when the vessel is resting on its bottom the opening is inclined to afford easy access to its contents, and the equatorial zone is inclined whereby its lower shoulder $b$ at its bottom portion tends to aid in supporting and preventing upsetting of the vessel and strengthens such portion against fractures. At the same time the parts $c$ of the equatorial zone adjacent to the horizontal radii of the cylinder of the zone provide extensive surfaces for contact with adjacent vessels when such vessels are arranged in a row upon a display table, thus strengthens them against fracture by each other, and this is aided by the shoulders $b$.

Due to the circular horizontal section of the vessels they may be arranged in numerous relations with great economy of space, while their spherical shape tends to ease of fabrication.

Having thus described my invention what I claim and desire to secure by Letters Patent is:

In a glass display vessel of substantially spherical shape having a hand opening therein around one end of an axis and a cylindrical equatorial zone around such axis, forming shoulders, a portion of such otherwise spherical vessel being flattened in a plane at an angle to the axis, such flattened portion extending substantially from the opposite end of the axis to the shoulder of the cylindrical zone.

In testimony whereof I hereunto affix my signature.

FERDINAND S. BARBIERS.